(12) United States Patent
DiMattina et al.

(10) Patent No.: US 8,336,762 B1
(45) Date of Patent: Dec. 25, 2012

(54) PAYMENT TRANSACTION PROCESSING

(75) Inventors: Robert B. DiMattina, Lighthouse Point, FL (US); Terri L. Melle-Johnson, Coral Springs, FL (US)

(73) Assignee: Greenwise Bankcard LLC, Coconut Creek, FL (US)

( * ) Notice: Subject to any disclaimer, the term of this patent is extended or adjusted under 35 U.S.C. 154(b) by 344 days.

(21) Appl. No.: 12/616,966

(22) Filed: Nov. 12, 2009

Related U.S. Application Data

(60) Provisional application No. 61/115,174, filed on Nov. 17, 2008.

(51) Int. Cl.
*G06K 5/00* (2006.01)

(52) U.S. Cl. ........................... 235/377; 235/380

(58) Field of Classification Search .................. 235/380, 235/379, 377, 375
See application file for complete search history.

(56) References Cited

U.S. PATENT DOCUMENTS

| | | |
|---|---|---|
| 3,678,463 A | 7/1972 | Peters |
| 4,267,577 A | 5/1981 | Hashimoto et al. |
| 4,293,927 A | 10/1981 | Hoshii |
| 4,312,035 A | 1/1982 | Greene |
| 4,316,247 A | 2/1982 | Iwamoto |
| 4,701,745 A | 10/1987 | Waterworth |
| 4,843,575 A | 6/1989 | Crane |
| 5,016,009 A | 5/1991 | Whiting et al. |
| 5,126,739 A | 6/1992 | Whiting et al. |
| 5,146,221 A | 9/1992 | Whiting et al. |
| 5,239,166 A | 8/1993 | Graves |
| 5,241,680 A | 8/1993 | Cole et al. |
| 5,386,458 A | 1/1995 | Nair et al. |
| 5,410,713 A | 4/1995 | White et al. |
| 5,414,425 A | 5/1995 | Whiting et al. |
| 5,418,969 A | 5/1995 | Matsuzaki et al. |
| 5,428,210 A | 6/1995 | Nair et al. |
| 5,448,044 A | 9/1995 | Price et al. |
| 5,457,305 A | 10/1995 | Akel et al. |
| 5,457,790 A | 10/1995 | Iwamura et al. |
| 5,457,801 A | 10/1995 | Aihara |
| 5,461,266 A | 10/1995 | Koreeda et al. |
| 5,466,919 A | 11/1995 | Hovakimian |
| 5,479,530 A | 12/1995 | Nair et al. |
| 5,560,020 A | 9/1996 | Nakatani et al. |
| 5,561,282 A | 10/1996 | Price et al. |
| 5,590,038 A | 12/1996 | Pitroda |
| 5,595,264 A | 1/1997 | Trotta, Jr. |
| 5,621,640 A | 4/1997 | Burke |
| 5,630,146 A | 5/1997 | Conary et al. |
| 5,632,037 A | 5/1997 | Maher et al. |
| 5,637,932 A | 6/1997 | Koreeda et al. |
| 5,638,299 A | 6/1997 | Miller |

(Continued)

FOREIGN PATENT DOCUMENTS

| CA | 2542988 A1 | 10/2007 |
|---|---|---|

(Continued)

*Primary Examiner* — Thien M Le
(74) *Attorney, Agent, or Firm* — Akerman & Senterfitt

(57) ABSTRACT

At least one datum is received from a point of sale terminal indicating an event that has occurred with respect to the terminal. A usage statistic is calculated for a specified period of time based on at least (1) a predetermined value relating to the event, and (2) at least one of (a) a number of transactions processed by the terminal in the specified period and (b) an amount of time that the terminal was in a sleep mode.

15 Claims, 3 Drawing Sheets

U.S. PATENT DOCUMENTS

| | | | |
|---|---|---|---|
| 5,638,519 A | 6/1997 | Haluska | |
| 5,696,909 A * | 12/1997 | Wallner | 705/44 |
| 5,739,512 A | 4/1998 | Tognazzini | |
| 5,781,901 A | 7/1998 | Kuzma | |
| 5,793,302 A | 8/1998 | Stambler | |
| 5,809,144 A | 9/1998 | Sirbu et al. | |
| 5,880,446 A | 3/1999 | Mori et al. | |
| 5,892,824 A | 4/1999 | Beatson et al. | |
| 5,909,794 A | 6/1999 | Molbak et al. | |
| 6,052,674 A | 4/2000 | Zervides et al. | |
| 6,061,433 A | 5/2000 | Polcyn et al. | |
| 6,078,820 A | 6/2000 | Wells et al. | |
| 6,088,682 A | 7/2000 | Burke | |
| 6,112,191 A | 8/2000 | Burke | |
| 6,125,281 A | 9/2000 | Wells et al. | |
| 6,173,409 B1 | 1/2001 | Watts, Jr. et al. | |
| 6,185,542 B1 | 2/2001 | Moran et al. | |
| 6,223,291 B1 | 4/2001 | Puhl et al. | |
| 6,223,293 B1 | 4/2001 | Foster et al. | |
| 6,226,618 B1 | 5/2001 | Downs et al. | |
| 6,341,353 B1 | 1/2002 | Herman et al. | |
| 6,397,340 B2 | 5/2002 | Watts, Jr. et al. | |
| 6,417,871 B1 | 7/2002 | Nomura et al. | |
| 6,520,409 B1 | 2/2003 | Mori et al. | |
| 6,543,683 B2 | 4/2003 | Hoffman | |
| 6,560,456 B1 | 5/2003 | Lohtia et al. | |
| 6,581,041 B1 | 6/2003 | Canney | |
| 6,785,620 B2 | 8/2004 | Kishlock et al. | |
| 6,865,191 B1 | 3/2005 | Bengtsson et al. | |
| 6,876,971 B1 | 4/2005 | Burke | |
| 6,898,575 B2 | 5/2005 | Mull | |
| 6,996,546 B1 | 2/2006 | Giles et al. | |
| 7,013,290 B2 | 3/2006 | Ananian | |
| 7,070,105 B2 | 7/2006 | Gatto et al. | |
| 7,111,777 B2 | 9/2006 | Singhal | |
| 7,158,948 B1 | 1/2007 | Rodriguez et al. | |
| 7,171,370 B2 | 1/2007 | Burke | |
| 7,232,063 B2 * | 6/2007 | Fandel et al. | 235/383 |
| 7,344,069 B1 * | 3/2008 | Morimoto | 235/383 |
| 7,353,394 B2 | 4/2008 | Marmigere et al. | |
| 7,366,516 B1 | 4/2008 | Oh et al. | |
| 7,366,687 B2 | 4/2008 | Yoshimine et al. | |
| 7,369,528 B2 | 5/2008 | Tian | |
| 7,369,865 B2 | 5/2008 | Gabriel et al. | |
| 7,392,940 B2 | 7/2008 | Hansen et al. | |
| 7,475,038 B2 | 1/2009 | Algiene et al. | |
| 7,487,912 B2 | 2/2009 | Seifert et al. | |
| 2002/0140714 A1 | 10/2002 | Hoffman | |
| 2002/0147645 A1 | 10/2002 | Alao et al. | |
| 2003/0028628 A1 * | 2/2003 | Irwin et al. | 709/222 |
| 2003/0065572 A1 | 4/2003 | McNee et al. | |
| 2003/0120607 A1 | 6/2003 | Piotrowski | |
| 2003/0132293 A1 | 7/2003 | Fitch et al. | |
| 2003/0132294 A1 | 7/2003 | Gomez et al. | |
| 2003/0141214 A1 | 7/2003 | Macguire | |
| 2005/0004867 A1 | 1/2005 | Spector | |
| 2005/0006468 A1 * | 1/2005 | Fandel et al. | 235/383 |
| 2005/0021353 A1 | 1/2005 | Aviles et al. | |
| 2005/0021363 A1 | 1/2005 | Stimson et al. | |
| 2005/0021365 A1 | 1/2005 | Nakfoor | |
| 2005/0080719 A1 | 4/2005 | Sellen et al. | |
| 2005/0091327 A1 | 4/2005 | Koch | |
| 2005/0125342 A1 | 6/2005 | Schiff | |
| 2005/0171849 A1 | 8/2005 | Brissette | |
| 2005/0251485 A1 | 11/2005 | Quigley | |
| 2006/0122856 A1 | 6/2006 | Rushton et al. | |
| 2006/0122874 A1 | 6/2006 | Postrel | |
| 2006/0178938 A1 | 8/2006 | Wallace | |
| 2006/0208064 A1 | 9/2006 | Mendelovich et al. | |
| 2006/0212390 A1 | 9/2006 | Gruber | |
| 2006/0273163 A1 | 12/2006 | Gusler et al. | |
| 2007/0022047 A1 | 1/2007 | Kingsborough et al. | |
| 2007/0022048 A1 | 1/2007 | Kingsborough et al. | |
| 2007/0045405 A1 | 3/2007 | Rothschild | |
| 2007/0050258 A1 | 3/2007 | Dohse | |
| 2007/0055567 A1 | 3/2007 | Viitaharju | |
| 2007/0088657 A1 | 4/2007 | Greene | |
| 2007/0094080 A1 * | 4/2007 | Wiken | 705/14 |
| 2007/0094087 A1 | 4/2007 | Mitchell et al. | |
| 2007/0094088 A1 | 4/2007 | Mastie et al. | |
| 2007/0214120 A1 | 9/2007 | Niendorff | |
| 2008/0021724 A1 | 1/2008 | Garfinkel | |
| 2008/0028473 A1 | 1/2008 | Cehelnik | |
| 2008/0033855 A1 | 2/2008 | Baker et al. | |
| 2008/0071640 A1 | 3/2008 | Nguyen | |
| 2008/0072406 A1 | 3/2008 | Sinclair | |
| 2008/0109304 A1 | 5/2008 | Sarelson et al. | |
| 2008/0147465 A1 * | 6/2008 | Raines et al. | 705/7 |
| 2008/0177624 A9 | 7/2008 | Dohse | |
| 2008/0195532 A1 | 8/2008 | Harkins et al. | |
| 2008/0195533 A1 | 8/2008 | Harkins et al. | |
| 2008/0268876 A1 | 10/2008 | Gelfand et al. | |
| 2008/0269018 A1 | 10/2008 | Nurmela et al. | |
| 2008/0270242 A1 | 10/2008 | Aaltonen | |
| 2008/0270246 A1 | 10/2008 | Chen | |
| 2008/0270302 A1 | 10/2008 | Beenau et al. | |
| 2010/0030624 A1 * | 2/2010 | Vanska et al. | 705/10 |

FOREIGN PATENT DOCUMENTS

| | | |
|---|---|---|
| EP | 0172344 A2 | 2/1986 |
| EP | 0451661 A2 | 10/1991 |
| EP | 1459229 A2 | 9/2004 |
| WO | WO-0075834 A2 | 12/2000 |
| WO | WO-03007092 A2 | 1/2003 |
| WO | WO-03054753 A2 | 7/2003 |
| WO | WO-2006/033643 A1 | 3/2006 |

* cited by examiner

PAYMENT TRANSACTION PROCESSING

CROSS-REFERENCE TO RELATED APPLICATIONS

This application claims the benefit of U.S. Provisional Application Ser. No. 61/115,174 filed Nov. 17, 2008, which is hereby incorporated by reference in its entirety.

BACKGROUND

Present payment card transactions consume significant amounts of paper and energy. Further, users, e.g., purchasers of goods and services, while payment card processing systems often have difficulty storing and maintaining paper receipts. Also, present payment card processing systems lack flexibility to accommodate various kinds of transactions such as charitable donations.

DETAILED DESCRIPTION OF PREFERRED EMBODIMENTS

Figure 1:
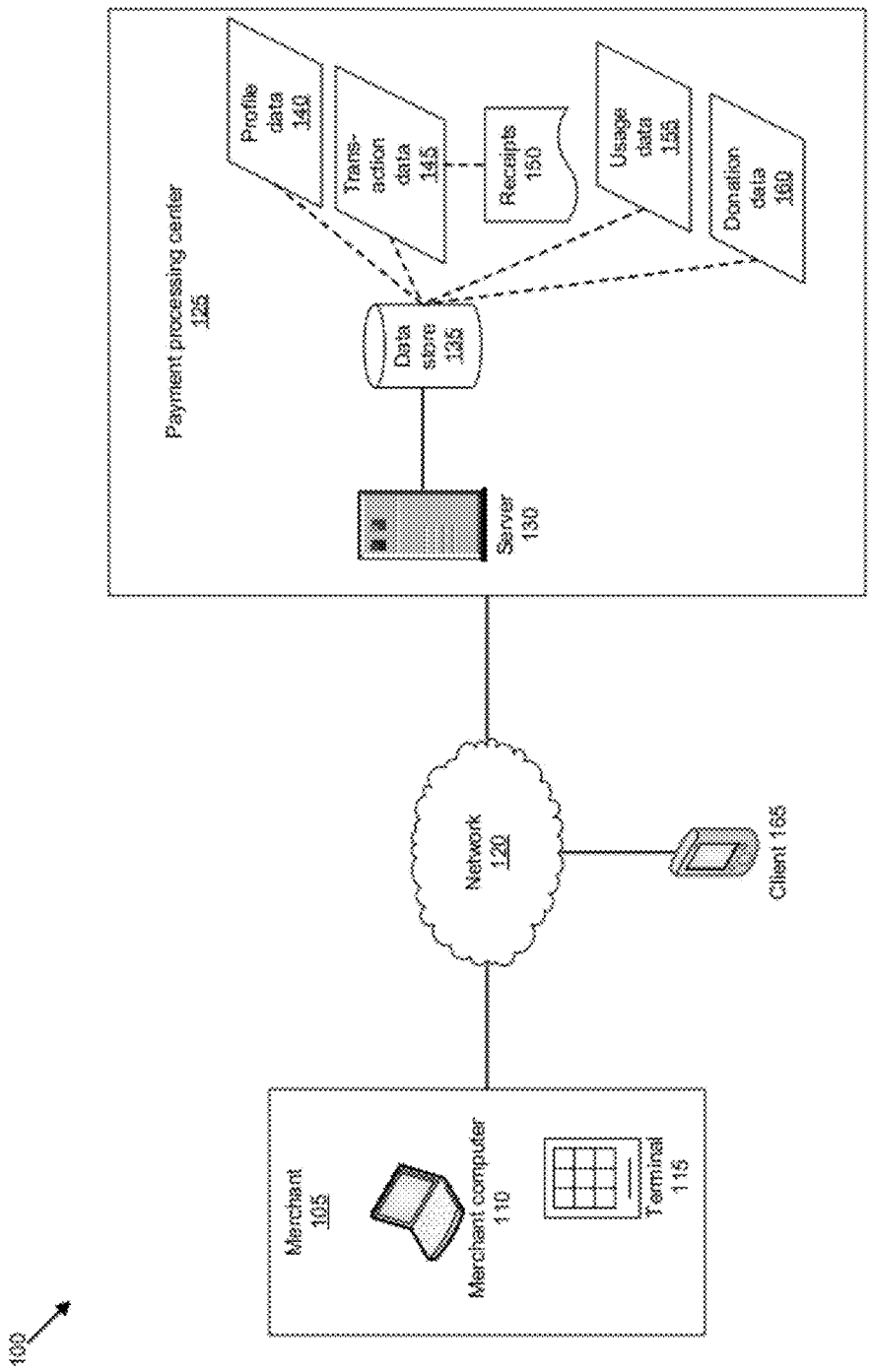
FIG. 1 illustrates an exemplary system for processing a payment transaction.

FIG. 1 illustrates an exemplary system 100 for processing a payment transaction. A merchant 105 may include a point of sale (POS) terminal 115 for processing transactions and further may include a merchant computer 110 capable of performing a variety of operations, including obtaining information relating to transactions and the processing of transactions. Terminal 115 may communicate, e.g., via a network 120, with a payment processing center 125. A transaction processing server 130, and a data store 135, may be included in the payment processing center 125. The data store 135 may include various sets of data related to one or more transactions, including profile data 140, transaction data 145, including electronic receipts 150, usage data 155, and donation data 160. A client device 165 may also access the server 130 and/or the data store 135, e.g., via the network 120.

The merchant 105 may be any retailer, wholesaler, or other provider of goods and/or services using a POS terminal 115 to process payment card transactions. In some cases, merchant 105 may be a stand-alone or self-service kiosk that includes a POS terminal 115 configured for payment card transactions. The payment card may include a debit card, a credit card, a gift card, etc. The merchant computer 110 may be a general-purpose computer or some other computer capable of communicating via network 120, such as a laptop computer, desktop computer, handheld computer, etc.

POS terminal 115 is generally a dedicated device for processing payment card transactions. For example, POS terminal 115 could be a model 3740/3750 or Vx 510 from Verifone, Inc. of San Jose, Calif., or a model 4210 from Hypercom Corporation of Scottsdale, Ariz. POS terminal 115 is capable of performing a variety of operations. The terminal 115 generally includes a keypad or some other mechanism for user input, along with a display for requesting user input, displaying information to a user, etc. Further, POS terminal 115 generally includes a magnetic card reader or some similar mechanism for reading information included on a payment card, e.g., on a magnetic strip or other computer-readable medium. Although POS terminal 115 is generally dedicated device, it should be understood that operations herein ascribed to the terminal 115 could be carried out by a general-purpose computing device capable of performing other operations. For example, it is possible that merchant computer 110 could carry out some or all of the operations herein ascribed to POS terminal 115. In general, POS terminal 115 includes a computer-readable medium, e.g., a memory, for storing instructions to carry out operations including such as are described herein, and a processor for executing such instructions.

Network 120 is generally a packet network, and may provide communications according to the known internet protocol (IP). As such, network 120 may use known protocols for transporting data, such as user datagram protocol (UDP), transport control protocol (TCP), hypertext transfer protocol (HTTP), etc. Further, network 120 may include a variety of networks such as a wide area network (WAN), e.g., the Internet, a local area network (LAN), etc. As is known, network 120 may be used to transport a variety of data, including multimedia data such as audio, images, and video.

Payment processing center 125 may be operated by a bank or other issuer of a payment card. For convenience, server 130 and data store 135 in payment processing center 125 are represented in FIG. 1 as single computing devices, respectively. In practice, operations ascribed herein to the server 130 included in the payment processing center 125 may be carried out by multiple computing devices. Similarly, multiple computing devices may be used to perform operations of data store 135.

Profile data 140 included in data store 135 generally includes a profile for a particular user. Because an individual user may hold multiple payment cards, and may use different payment cards for different transactions, profile data 140 may include data concerning multiple payment cards in a single profile. Profile data 140 may also be associated with multiple users in certain instances, e.g., where two users such as a husband and wife jointly hold one or more payment cards.

Profile data 140 may include identifying information for a user or users associated with a profile, e.g., name, physical address, telephone number or numbers, text message address or addresses (e.g., an address to which a Simple Message Service (SMS) message may be sent), e-mail address or addresses, truncated cardholder data such as first and last four digits of a payment card number, etc. Further, profile data 140 may include user preference information relating to a user's preferences concerning how transactions are conducted. For example, profile data 140 may include a field of data indicating whether, when conducting a payment card transaction, the user or users wish to receive a paper receipt, an electronic receipt 150, or both. Moreover, in cases where the user or users wish to receive an electronic receipt 150, the profile data 140 may indicate a mode of delivering the receipt 150, e.g., via facsimile, e-mail, text message, etc., as well as a format for the receipt 150, e.g., text data, image data, etc., and a specific destination, e.g., a cellular telephone number for a text message, an e-mail address, etc. to which the receipt 150 should be sent.

User preferences related to making charitable donations as part of a payment card transaction may also be included in profile data 140. For example, profile data 140 could include an indication of a percentage of the amount of each payment card transaction to be made as a charitable donation, along with identifiers for one or more charities to whom the donation is to be made.

Profile data 140 could include further information concerning user preferences. For example, a user may prefer to receive electronic receipts 150, or may be prefer to receive paper receipts, may subscribe to receive coupons or other offers, could subscribe to receive SMS messages, etc.

Each set of profile data 140 associated with a particular user or users is generally associated with a unique or substantially unique identifier. Further, a set of profile data 140 may be associated with other identifiers, which also may be unique or substantially unique, such as an identifier associated with a payment card. As discussed below, such association of a payment card identifier with profile data 140 allows profile data 140 for a user to be retrieved by a POS terminal 115 when that particular user is conducting a payment card transactions through the particular POS terminal 115.

Various mechanisms may be used to obtain profile data 140. For example, as discussed below, profile data 140 may be collected in response to prompts provided by terminal 115. Additionally or alternatively, profile data 140 may be gathered through an interface provided by server 130, such as one or more web pages. Accordingly, server 130 may include instructions for providing a web server or the like.

Transaction data 145 includes data relating to a transaction originated through a POS terminal 115. For example, a record of transaction data 145 may include fields indicating a time of a transaction, a payment card type, a payment card number, a customer name, a transaction amount, merchant identification number, terminal number, etc., generally also along with a unique or substantially unique identifier for the transaction. This identifier may sometimes be referred to as a "transaction identifier" or a "transactional locator identifier code."

Transaction data 145 may further include a record of whether an electronic receipt 150 was provided, and if so, may further include a record of a mode of delivery for the receipt 150. The electronic receipt 150 is also generally included in transaction data 145. A receipt 150 may include textual data, i.e., data in human-readable format, such as an American Standard Code for Information Interchange (ASCII) text file, and/or image data, e.g., data in a bitmap or compressed format, such as a Joint Photographic Experts Group (JPEG) file, a Graphical Interchange Format (GIF) file, etc.

Also, transaction data 145 may include a record of any charitable donations made as part of the transaction, e.g., an amount of donation and information identifying a charity or charities to which the donation was made. In some cases, transaction data 145 may include only a record of a charitable donation or charitable donations, i.e., a transaction through a terminal 115 may include only a payment to a charitable institution and need not also include a payment to a merchant 105 for goods and services.

Usage data 155 includes data relating to use of terminal 115. For example, a record of usage data 155 may include data concerning a number of transactions processed by the terminal 115 in a given time period, e.g., a day, along with data concerning times when the terminal 115 was fully powered up and times when the terminal 115 was in a sleep mode. As discussed elsewhere herein, terminal 115 may be programmed to become dormant, i.e., in a sleep mode, if the terminal 115 has not received any inputs for a given period of time, e.g., one minute, five minutes, fifteen minutes, etc. Further, terminal 115 may transmit to server 130 a datum such as a timestamp upon becoming dormant, or upon receiving input to leave a sleep mode and become fully powered up, the timestamp generally being accompanied by an indicator of the event, e.g., becoming fully powered up, associated with the timestamp. A timestamp may indicate a specific date and time of day down to the seconds-level.

Donation data 160 includes data relating to charitable donations made as part of transactions processed through a terminal 115. For example, a record of donation data 160 may include an amount of a charitable donation, a name of a charity to which the donation is provided, etc., along with a unique or substantially unique identifier for the donation. As mentioned above, donation data 160 is often included in transaction data 145. However, once donation data is provided to server 130, it is generally stored separately from transaction data 145 even if also included in transaction data 145 in data store 135.

Client device 165 may be any computing device capable of communicating via network 120. Client device 160 is typically a general-purpose computing device, such as a laptop computer, desktop computer, handheld computer, etc. Often, client device 160 is a mobile computing device that communicates via a cellular network or a broadband wireless connection.

Computing devices such as those discussed herein, e.g., terminal 115, server 130, client 160, and a computer including data store 135, generally each include instructions executable by one or more computing devices such as those listed above. Computer-executable instructions may be compiled or interpreted from computer programs created using a variety of programming languages and/or technologies known to those skilled in the art, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable medium includes any medium that participates in providing data (e.g., instructions), which may be read by a computer. Such a medium may take many forms, including, but not limited to, non-volatile media, volatile media, and transmission media. Non-volatile media include, for example, optical or magnetic disks and other persistent memory. Volatile media include dynamic random access memory (DRAM), which typically constitutes a main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Databases or data stores described herein such as data store 135 may include various kinds of mechanisms for storing, accessing, and retrieving various kinds of data, including a hierarchical database, a set of files in a file system, an application database in a proprietary format, a relational database management system (RDBMS), etc. Each such database or data store is generally included within a computing device employing a computer operating system such as one of those mentioned above, and are accessed via a network in any one or more of a variety of manners, as is known. A file system may be accessible from a computer operating system, and may include files stored in various formats. An RDBMS generally employs the known Structured Query Language (SQL) in addition to a language for creating, storing, editing, and executing stored procedures, such as the PL/SQL language mentioned above.

Data described herein is generally stored as a plurality of records. For example, data stored in various formats, such as a relational format in an RDBMS, are generally included in tables that include records (also known as rows) and fields (also known as columns). An empty table includes no records, but generally a table includes one or more records. Further, database records are generally identified by a unique or substantially unique identifier that may be included in a single field, or that may be the unique or substantially unique combination of more than one fields, i.e., a compound key.

Figure 2:
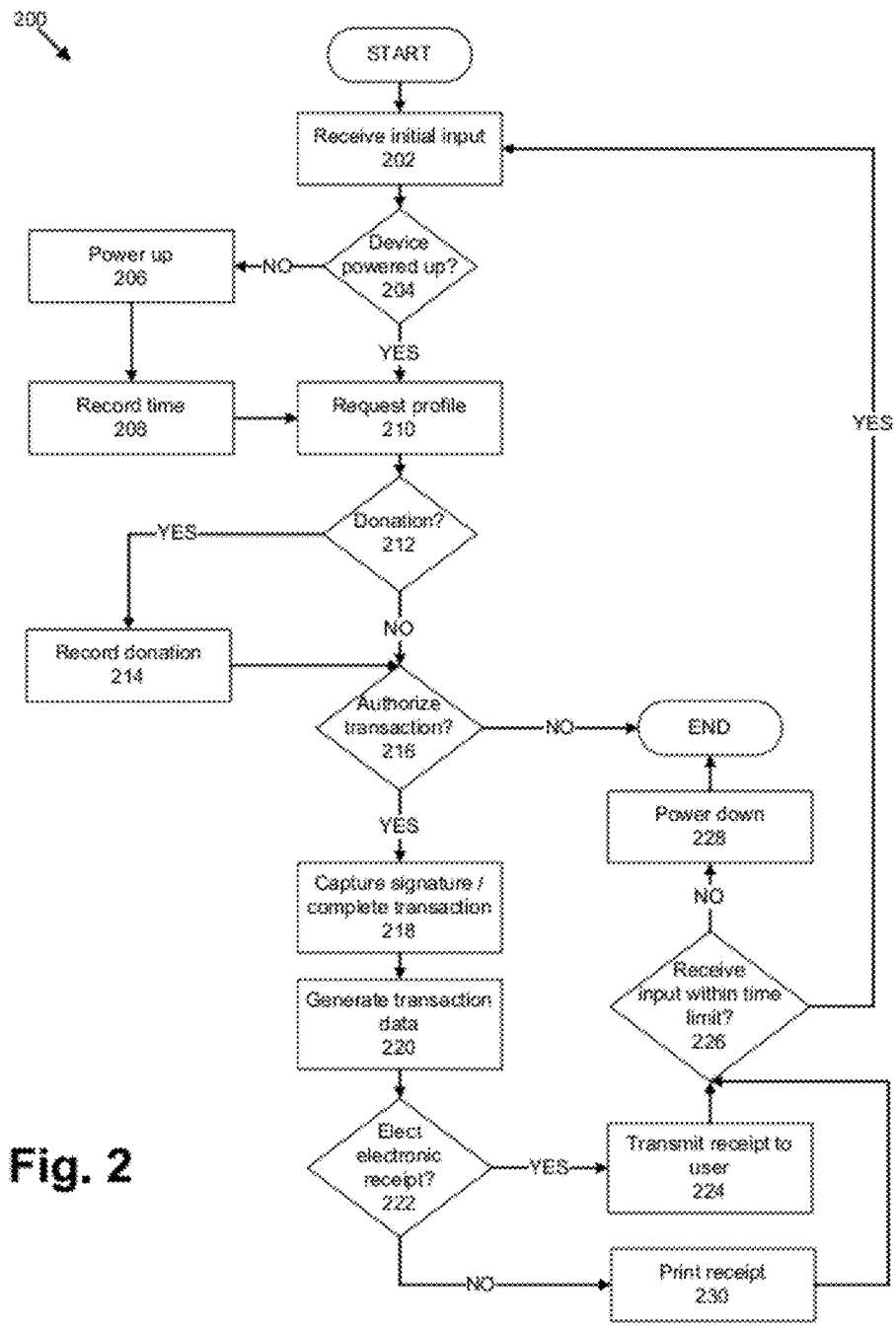
FIG. 2 illustrates an exemplary process for processing a payment card transaction via a point of sale terminal.

FIG. 2 illustrates an exemplary process 200 for processing a payment card transaction via a POS terminal 115. It is to be understood, however, that payment card transactions could be processed via other mechanisms. For example, client 165 could be used for initiating and processing certain transactions, e.g., charitable donations.

The process 200 begins in a step 202, in which POS terminal 115 receives an input initiating a payment card transaction. Such input may be received in a variety of ways, including via a touchscreen included in the terminal 115, by a button or key included a keypad included in the terminal 115 being depressed, by a payment card being swiped through a reader included in the terminal 115, etc.

Next, in step 204, if the POS terminal 115 is fully powered up upon receiving the input of step 202, then process 200 proceeds to step 210. Otherwise, process 200 proceeds to step 206.

In step 206, POS terminal 115 exits a sleep mode, sometimes also referred to as a dormant mode, hibernation mode, or a suspended mode.

Following step 206, in step 208, POS terminal 115 records a timestamp, e.g., a date and time (e.g., Jan. 1, 2008, at 11:30:53 PM). This timestamp may be sent to server 130 to be included in usage data 155, either as part of step 208, or later in process 200, e.g., the timestamp could be included in transaction data 145.

In step 210, POS terminal 115 requests a user profile, i.e., a profile associated with a payment card being used for the transaction, from server 130. For example, if a payment card was swiped in step 202, the user profile may be requested using identifying information read from the payment card. However, it is also possible for POS terminal 115 to include instructions for prompting a user to provide identifying information, e.g., a user name and/or personal identification number (PIN), etc. For example, after an initial input is received in step 202, and the terminal 115 is powered up, if necessary, the terminal 115 could include instructions to display words such as "Please enter your personal identification number and then press 'Enter.'" The terminal 115 could further be configured to receive an entered PIN, and to transmit the PIN to server 130 with a request for profile data 140.

In some cases, server 130 will be unable to provide profile data 140 for the customer. For example, profile data 140 may not exist for the customer. Terminal 115 may include instructions for gathering information from a user, e.g., a customer, for profile data 140. For example, terminal 115 could be configured to display prompts for a user to enter identifying information such as the user's name, address, telephone number, e-mail address, preferences relating to charitable donations, preferences relating to receiving the electronic receipts 150, etc.

Next, in step 212, terminal 115 determines whether a user has agreed to make a charitable donation as part of the transaction. Terminal 115 could be configured to automatically have a customer make a charitable donation based on information included in profile data 140. Alternatively, terminal 115 could be configured to have a customer make a charitable donation based on information included in profile data 140, but after having the customer confirm that the customer wished to make the donation. For example, terminal 115 could be configured to display words such as "Please confirm that you wish to make a donation in the amount of $5.00 to Charity X." A donation amount could be established other than according to a fixed dollar amount. For example, a donation could alternatively be made in an amount that was some percentage of a payment card transaction.

Further, absent information in profile data 140 relating to a user's preferences concerning charitable donations, terminal 115 could be configured to display a prompt asking whether the user wishes to make a charitable donation. Then, if a user provided input indicating that the user did wish to make a charitable donation, terminal 115 could further be configured to display different possible values for a donation (e.g., $1.00, $3.00, $5.00, etc.). Often, a charitable institution or institutions to which donations are to be made is selected by the merchant 105, and simply identified to the user, e.g., through a message displayed by terminal 115. That is, each merchant 105 may designate a particular charity or charities to which donations may be made through its terminals 115. In such cases, a charitable institution or institutions may be associated with an identifier for the merchant 105 in data store 135. However, terminal 115 could alternatively be configured to display one or more prompts allowing the user to select from a list of one or more charitable institutions to which donations could be made, and/or allowing the user to indicate an amount of a donation, etc. In such cases, the provided list of charitable institutions may be associated with an identifier for the merchant 105 hosting the POS terminal 115 being used for the transactions. Further, terminal 115 could be configured to add information obtained from a user concerning charitable donations to the user's profile data 140.

As noted above, a transaction could include only a charitable donation, and not a purchase of goods and/or services from a merchant 105. A donation-only transaction could be conducted through a POS terminal 115 in a merchant 105. However, as mentioned above, transactions could be initiated via other mechanisms. For example, charitable donations could be initiated by client 165 accessing an interface, e.g., a webpage, provided by server 130. In such event, process 200 would be executed much as described herein, although certain steps could be omitted, e.g., steps 204-208 relating to determining and acting on whether a device was in a sleep or suspended mode when an initial input was received. Further, conducting a transaction through client 165 may obviate any possibility for a paper receipt, and therefore could permit omitting steps such as 222 and 230 described below.

Step 214 is executed if it is determined in step 212 that the user wishes to make a charitable donation. Otherwise, step 216 follows step 212.

In step 214, terminal 115 records that the user wishes to make a charitable donation. Generally, terminal 115 transmits information to server 130 that is stored as donation data 160. For example, as described above, terminal 115 may have collected from a user, and/or a user profile may include, information concerning a user's preferences concerning a charitable donation, such as an amount of the donation, and a charitable institution to which the donation is to be made.

In step 216, which may follow either step 212 or step 214, terminal 115 executes a process to authorize the transaction requested by the customer, e.g., payment card information, a transaction amount, an identifier for the merchant 105, and other transaction data as needed, is transmitted to payment processing center 125 for a determination as to whether the requested transaction is authorized by the payment card issuer. If a transaction is not authorized, then process 200 ends following step 216. Otherwise, step 218 is executed next.

In step 218, POS terminal 115 performs operations to complete the transaction. For example, a user may be prompted to confirm a transaction amount, and/or such prompt may have been provided prior to the transaction being authorized. Further, a user signature may be digitally captured through an input mechanism included in the terminal 115.

Next, in step 220, terminal 115 transmits data relating to the transaction to server 130, such data then generally being stored by data store 135 as transaction data 145. Generally as part of step 220, terminal 115 generates electronic receipt 150, the electronic received 150 generally being included in the transaction data 145.

Next, in step 222, terminal 115 determines whether the user has selected to receive an electronic receipt 150. For example, a user could be prompted to indicate that an electronic receipt 150 is desired, a user's preferences could be included in profile data 140 as discussed above, etc. If the user desires electronic receipt 150, step 224 is executed next. Otherwise, step 230 is executed next.

In step 224, terminal 115 causes the electronic receipt 150 to be sent to an address, e.g., an e-mail address, a text message address, etc., selected by the user, e.g., in response to a prompt by terminal 115, based on information included in profile data 140, etc. Thus, a user receiving the image file that includes the electronic receipt 150 can open the file on client 165 and view an image of a receipt 150 that is substantially similar to a printed receipt that would have been provided, generally including a digital image of the user's signature on the receipt.

Next, in step 226, terminal 115 determines whether it has received any input within a predetermined period of time, e.g., 120 seconds, five minutes, 15 minutes, one hour, etc. If so, process 200 returns to step 202. Otherwise, step 228 is executed next.

In step 228, terminal 115 enters a dormant mode, such as a sleep mode or a suspend mode. Following step 228, process 200 ends.

Step 230 may follow step 222, as discussed above. In step 230, terminal 115 prints a paper receipt, e.g., using a printer included in the terminal 115 or attached to it. Note that step 230 may be executed in addition to step 224, rather than as an alternative as depicted in FIG. 2. Following step 230, process 200 proceeds to step 226.

Figure 3:
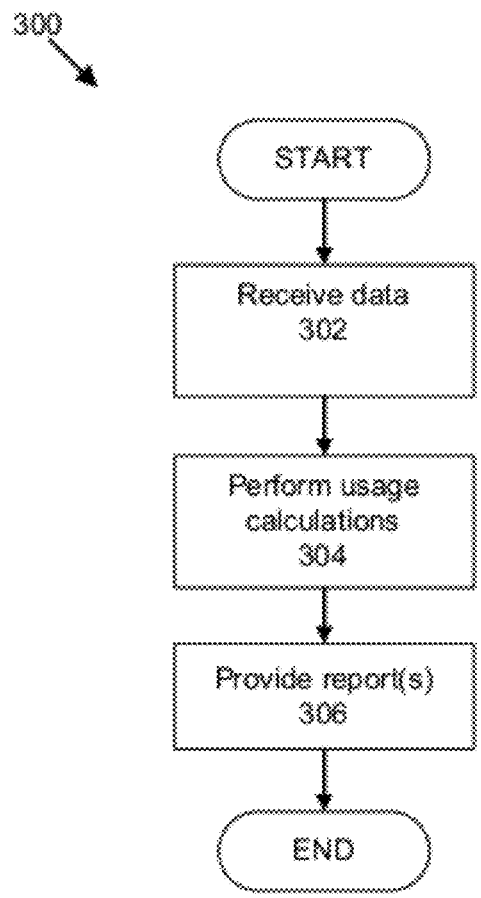
FIG. 3 illustrates an exemplary process that may be executed by a server in a payment processing center.

FIG. 3 illustrates a process 300 that may be executed by server 130. The process 300 begins in a step 302, in which data is received from a merchant 105, and generally then stored in data store 135. For example, transaction data 145 may be received from a POS terminal 115, e.g., as described with respect to process 200.

Further, data included in the transaction data 145 may also be included in usage data 155, or data to be included in usage data 155 may be provided separately. For example, as discussed above with respect to process 200, timestamps relating to a terminal 115 entering and leaving a sleep or suspend mode may be provided separately.

As also discussed with respect to process 200, data relating to charitable donations may also be included in the transaction data 145 provided to server 130, and may be stored as donation data 160.

Next, in step 304, server 130 performs usage calculations to create and/or update usage data 155 relating to the terminal 115 for which data was received in step 302. For example, usage data 155 may include a field indicating how much paper is estimated to have been saved by use of electronic receipts 150 rather than paper receipts for transactions involving the terminal 115. Paper savings may be estimated in various ways. For example, an average amount of paper, or at least an approximation of an average amount of paper, that is used in printing paper receipts for transactions using the terminal 115 may be identified and stored in data store 135 as a predetermined datum to be used in calculating paper usage data 155. Similarly, an average amount of paper used for a printed receipt could be identified for a group of terminals 115, or for all terminals in system 100.

Generally, usage data 155 may include an amount of paper saved by the terminal 115 within a given time period, this amount obtained by multiplying an average amount of paper used per transaction by a number of paperless transactions in the time period for the terminal. Paper usage data 155 may be updated on a real-time or near real-time basis. That is, when transaction data 145 is stored, server 130 then updates paper usage data 155 to reflect the new transaction. Further, paper usage data 155 relating to one or more time periods, e.g., the preceding 24 hours, a calendar month, etc., may be stored and/or calculated for reporting, e.g., to client 165 is discussed further below.

Usage data 155 may additionally or alternatively include data related to energy savings resulting from placing the terminal 115 in a sleep or suspend mode. Transaction data 145 includes a time of a transaction, and server 130 generally also receives information concerning whether the terminal 115 was in a sleep or suspend mode prior to the transaction, along with timestamps indicating when a sleep or suspend mode began and ended, as discussed above. By multiplying an amount of time spent in a sleep or suspend mode by an average amount of energy consumed by a terminal 115 per time unit, an amount of energy saved for a given time period may be included in usage data 155. The average amount of energy saved for a given time period, like an average amount of paper used in a transaction, may be a predetermined value stored in data store 135. Like paper usage data 155, energy savings data 155 may be updated on a real-time or near real-time basis.

Next, in step 306, server 130 provides reports, e.g., to client 165, to merchant 105 using a merchant computer 110, etc., via network 120. Reports may be provided via a web page, or in response to a request for an e-mail, text message, etc. Various reports with respect to various time periods may be provided using some or all of one or more of transaction data 145, usage data 155, and donation data 160. For example, a report could show an amount of paper, or an amount of energy, saved for various time periods for one or more sets of POS terminals 115, one or more merchants 105, etc. To take another example, a report could show amounts donated to one or more charities by a particular user, or through a particular merchant 105, etc. Reports aggregating various fields of transaction data 145 are also possible, e.g., showing a total amount spent by merchant 105 for a given time period or time periods. Such reports can be formatted for download by various accounting software packages, such as Quicken® from Intuit, Inc.

A report could include a file of image data including an electronic receipt 150. In some cases, a report may include only a file of image data including an electronic receipt 150. Thus, client 165 or merchant computer 110 could be used to retrieve the receipt 150 for reference, or for printing, if a printed receipt is then needed, in advance of, or when, an item is being exchanged or returned at a merchant 105. Further, a user could use a report including electronic receipt 150 to verify transactions, detect whether an unauthorized person was using a payment card, etc.

As mentioned above, certain data in data store 135 is often provided on a real-time or near real-time basis. Therefore, reports obtained by a client 165 or merchant computer 110, whether in response to a query or a report being triggered according to a predetermined rule (e.g., a report value such as a number of transactions occurring within a given time period), may include data provided on a real-time or near real-time basis.

Following step 306, process 300 ends.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A method, comprising:
   receiving at least one datum from a point of sale terminal indicating an event that has occurred with respect to the terminal; and
   calculating, in a computer, a usage statistic for a specified period of time based on at least (1) a predetermined value relating to the event, and (2) at least one of (a) a number of transactions processed by the terminal in the specified period and (b) an amount of time that the terminal was in a sleep mode,
   wherein the event is one of the point of sale terminal being awakened from a sleep mode and a paperless receipt being sent for a transaction processed through the terminal.

2. A method, comprising:
   receiving at least one datum from a point of sale terminal indicating an event that has occurred with respect to the terminal; and
   calculating, in a computer, a usage statistic for a specified period of time based on at least (1) a predetermined value relating to the event, and (2) at least one of (a) a number of transactions processed by the terminal in the specified period and (b) an amount of time that the terminal was in a sleep mode,
   wherein the predetermined value is an average amount of paper used in a printed receipt for a transaction processed by the terminal, the calculating further comprising multiplying the predetermined value by a number of transactions processed by the terminal in a specified period of time, whereby the usage statistic is an estimated amount of paper saved in the period of time.

3. The method of claim 2, further comprising providing a report that includes the usage statistic.

4. A method, comprising:
   receiving at least one datum from a point of sale terminal indicating an event that has occurred with respect to the terminal; and
   calculating, in a computer, a usage statistic for a specified period of time based on at least (1) a predetermined value relating to the event, and (2) at least one of (a) a number of transactions processed by the terminal in the specified period and (b) an amount of time that the terminal was in a sleep mode,
   wherein the predetermined value is an average amount of energy used by the terminal in a unit of time, the calculating further comprising determining a number of the units included in the amount of time that the terminal was in the sleep mode and multiplying the number of the units by the predetermined value, whereby the usage statistic is an estimated amount of energy saved in the time that the terminal was in the sleep mode.

5. The method of claim 4, further comprising providing a report that includes the usage statistic.

6. A system, comprising:
   a computing device configured to:
   receive at least one datum from a point of sale terminal indicating an event that has occurred with respect to the terminal; and
   calculate a usage statistic for a specified period of time based on at least (1) a predetermined value relating to the event, and (2) at least one of (a) a number of transactions processed by the terminal in the specified period and (b) an amount of time that the terminal was in sleep mode,
   wherein the event is one of the point of sale terminal being awakened from a sleep mode and a paperless receipt being sent for a transaction processed through the terminal.

7. A system, comprising:
   a computing device configured to:
   receive at least one datum from a point of sale terminal indicating an event that has occurred with respect to the terminal; and
   calculate a usage statistic for a specified period of time based on at least (1) a predetermined value relating to the event, and (2) at least one of (a) a number of transactions processed by the terminal in the specified period and (b) an amount of time that the terminal was in sleep mode, wherein the predetermined value is an average amount of paper used in a printed receipt for a transaction processed by the terminal, the computing device being further configured to calculate the usage statistic at least in part by multiplying the predetermined value by a number of transactions processed by the terminal in a specified period of time, whereby the usage statistic is an estimated amount of paper saved in the period of time.

8. The system of claim 7, the computing device being further configured to provide a report that includes the usage statistic.

9. A system, comprising:
a computing device configured to:
receive at least one datum from a point of sale terminal indicating an event that has occurred with respect to the terminal; and
calculate a usage statistic for a specified period of time based on at least (1) a predetermined value relating to the event, and (2) at least one of (a) a number of transactions processed by the terminal in the specified period and (b) an amount of time that the terminal was in sleep mode,
wherein the predetermined value is an average amount of energy used by the terminal in a unit of time, the computing device being further configured to calculate the usage statistic at least in part by determining a number of the units included in the amount of time that the terminal was in the sleep mode and multiplying the number of the units by the predetermined value, whereby the usage statistic is an estimated amount of energy saved in the time that the terminal was in the sleep mode.

10. The system of claim 9, the computing device being further configured to provide a report that includes the usage statistic.

11. A computer-readable medium including computer-readable instructions tangibly embodied thereon, the instructions being executable by a processor and including instructions for:
receiving at least one datum from a point of sale terminal indicating an event that has occurred with respect to the terminal; and
calculating a usage statistic for a specified period of time based on at least (1) a predetermined value relating to the event, and (2) at least one of (a) a number of transactions processed by the terminal in the specified period and (b) an amount of time that the terminal was in a sleep mode,
wherein the event is one of the point of sale terminal being awakened from a sleep mode and a paperless receipt being sent for a transaction processed through the terminal.

12. A computer-readable medium including computer-readable instructions tangibly embodied thereon, the instructions being executable by a processor and including instructions for:
receiving at least one datum from a point of sale terminal indicating an event that has occurred with respect to the terminal; and
calculating a usage statistic for a specified period of time based on at least (1) a predetermined value relating to the event, and (2) at least one of (a) a number of transactions processed by the terminal in the specified period and (b) an amount of time that the terminal was in a sleep mode,
wherein the predetermined value is an average amount of paper used in a printed receipt for a transaction processed by the terminal, the instructions further including instructions for performing the calculating by multiplying the predetermined value by a number of transactions processed by the terminal in a specified period of time, whereby the usage statistic is an estimated amount of paper saved in the period of time.

13. The medium of claim 12, the instructions further including instructions for providing a report that includes the usage statistic.

14. A computer-readable medium including computer-readable instructions tangibly embodied thereon, the instructions being executable by a processor and including instructions for:
receiving at least one datum from a point of sale terminal indicating an event that has occurred with respect to the terminal; and
calculating a usage statistic for a specified period of time based on at least (1) a predetermined value relating to the event, and (2) at least one of (a) a number of transactions processed by the terminal in the specified period and (b) an amount of time that the terminal was in a sleep mode,
wherein the predetermined value is an average amount of energy used by the terminal in a unit of time, the instructions further including instructions for performing the calculating by determining a number of the units included in the amount of time that the terminal was in sleep mode and multiplying the number of the units by the predetermined value, whereby the usage statistic is an estimated amount of energy saved in the time that the terminal was in the sleep mode.

15. The medium of claim 14, the instructions further including instructions for providing a report that includes the usage statistic.

* * * * *